United States Patent [19]

Schonberg et al.

[11] Patent Number: 5,523,577
[45] Date of Patent: *Jun. 4, 1996

[54] ELECTRON BEAM SYSTEM

[75] Inventors: Peter R. Schonberg, Santa Cruz County; Russell G. Schonberg; David R. Fadness, both of Santa Clara County, all of Calif.

[73] Assignee: Zapit Technology, Inc., Santa Clara, Calif.

[*] Notice: The trm of this patent shall not extend beyond the expiration date of Pat. No. 5,357,291.

[21] Appl. No.: 360,372

[22] Filed: Dec. 21, 1994

Related U.S. Application Data

[63] Continuation of Ser. No. 62,964, May 14, 1993, Pat. No. 5,378,898, which is a continuation of Ser. No. 992,614, Dec. 18, 1992, Pat. No. 5,357,291, and a continuation-in-part of Ser. No. 941,788, Sep. 8, 1992, Pat. No. 5,319,211.

[51] Int. Cl.⁶ .................................................. B01J 19/08
[52] U.S. Cl. .................... 250/492.3; 250/435; 204/157.3
[58] Field of Search ................................. 250/492.3, 432, 250/435; 204/157.15, 157.3, 157.44; 422/186

[56] References Cited

U.S. PATENT DOCUMENTS 5,357,291  10/1994  Schonberg et al. ................. 250/492.3
5,378,898   1/1995  Schonberg et al. ................. 250/492.3

Primary Examiner—Jack I. Berman
Attorney, Agent, or Firm—Stanley Z. Cole

[57] ABSTRACT

An electron beam source or generator is described for the treatment of toxic materials in a treatment system in which electron beams are reacted with a flowing influent in a reaction chamber. The system is modular allowing different configurations as demanded by the site and by the clean-up job. It is also portable in that it can be easily moved from place to place. If mounted on a movable base it can be taken from place to place for use.

8 Claims, 5 Drawing Sheets

ELECTRON BEAM SYSTEM

BACKGROUND OF THE INVENTION

This is a continuation application of prior application Ser. No. 08/062,964 filed on May 14, 1993 and scheduled to issue as U.S. Pat. No. 5,378,898 on Jan. 3, 1995, which is a continuation of application Ser. No. 07/992,614, entitled Transportable Electron Beam System and Method, filed Dec. 18, 1992, now U.S. Pat. No. 5,357,291 and a continuation in part of application Ser. No. 07/941,788, entitled Toxic Remediation System and Method, filed Sep. 8, 1992, now U.S. Pat. No. 5,319,211 and relates to methods and apparatus for treating and/or chemically converting toxics in fluids including gases, vapors, aerosols, and/or suspended particulates.

In particular, this invention relates to an electron generator or source and processing units used to configure an electron beam system to treat and/or convert toxics, as are, for example, typically found in gases, vapors or extractions from polluted soil, or from groundwater, or as output from industrial processes.

Products and by-products of industrial processes, toxic organic compounds, various forms of waste and other discards contaminate our air, soil, and groundwater. Industrial processes are generating additional toxic organic compounds, adding to existing contamination. Toxics created by incinerators, rotary kilns and bioreactors are also major sources of contamination. Recognition of this problem has led to the development of diverse extraction, collection, and disposal methods in an attempt to reduce the effects of pollution in our society and on our environment.

Techniques such as air stripping and vacuum extraction are used to remove contaminants from, among other things, soil and groundwater. However, venting contaminants directly to the atmosphere is environmentally undesirable. Thus, treatment of contaminants before release or disposal is greatly desired and is addressed by this invention. This invention has additional applications in air and water purification as well as in on-line chemical processing in manufacturing and other facilities.

Carbon containment is a collection technique in which contaminants pass through canisters containing carbon or certain plastic materials (or other adsorbent) with the result that toxics are adsorbed on the carbon or other material. In remediation systems for removal of volatile organic compounds from soil and groundwater, the contaminant sources may be vacuum extraction wells or air strippers. In effluent treatment systems of refineries or chemical plants, the contaminants may be the discharge of an industrial process. In any case, volatile organic contaminants are adsorbed onto the carbon or other adsorbent material, while the remaining portion of the extracted air, steam, or process effluent is released to the environment along with contaminants which the adsorption system fails to remove.

Carbon canisters with adsorbed toxics, however, create a disposal problem of their own. This is further complicated by the transport problem to move canisters to a treatment facility. In addition, containment of the adsorbed toxics, whether kept in a single location or moved, is not universally effective, as some volatile organic compounds and other pollutants have low adsorptivity.

Another remediation technique, incineration, attempts to destroy contaminants through high-temperature burning. As with carbon containment systems, the vapors may come from vacuum extraction wells, air strippers, or industrial process effluent. Destruction of these contaminants by incineration is often incomplete, however, and incomplete destruction can produce (and release to the atmosphere) compounds more hazardous than the original contaminants. Furthermore, incineration is often undesirable at refineries and chemical plants because of the dangers presented by the incinerator's high temperatures near flammable substances. Moreover, and clearly in populated areas, incineration is politically and socially undesirable.

In accordance with this invention, electron beams are used to process or convert toxic and nontoxic compounds to different compounds or elements. Influents, comprising gases, aerosols, and/or suspended particulates enter a reaction chamber into which a beam of electrons is injected. These electrons interact with the influent to chemically transform harmful compounds into environmentally safe elements or other compounds.

It should be understood that the words "gas", "material", or like terminology to describe the influent flow, as used in the specification and claims in describing this invention, is intended to mean gas or gases, vapor or vapors, colloidal dispersions, foams, fogs, emulsions, aerosols, or combinations thereof, as well as suspended particulates in a supporting material.

Prior art electron beam conversion systems were typically designed to fit the composition and flow rate parameters of a single material source. For example, U.S. Pat. No. 4,507,265 describes a power plant effluent gas treatment system in which electron beams convert flowing sulfur oxides and nitrogen oxides into solids and mists for later removal by a dust collector. Since the conversion facility is dedicated to a single source of material, the reaction chamber and electron beam sources were not designed to accommodate large variations in flow rate or composition. In addition, this prior art technique fails to address the conversion of other toxic materials, such as volatile organic compounds, to relatively benign compounds or elements which can be dealt with by conventional means. Also, these prior art systems have generally been large and immobile and typically have high power requirements which is a different type of structure and methodology than that described in the instant application.

SUMMARY OF THE INVENTION

This invention describes an electron beam generator to supply electrons as well as processing units comprising electron beam sources or generators and related reaction chambers, in which toxics are destroyed and which, because of features such as modularity, simplify the configuration and/or the ability to create systems to meet specific requirements. For example, a system requirement may include transportability, ease of assembly and freedom in designing, in physical dimensions, systems to be used in otherwise inaccessible areas, the handling of a variety of inputs including different influent flow rates, and an ability to treat different compositions, phases (gas, liquid, solid) or materials. This invention achieves these objectives.

This invention also simplifies reconfiguration of systems if the influent flow rates and/or compositions change. In addition, because the processing unit is small and lightweight and because the new and preferred electron beam source is relatively inexpensive and requires less of a power supply to function, the system is less costly to manufacture and use and can readily be used at almost any location. The small size and weight of the processing unit, referred to herein as portable, and its low power requirements make this design particularly well-suited for transportable electron beam conversion systems and for remediation systems configured for small spaces or remote locations.

Processing units of this invention are built as modules and such modules can be configured to satisfy a designated range of influent flow rates and electron beam dose rates. When configuring a system to meet a designated influent flow rate and composition of influent, modules can be arranged in series and/or in parallel as needed.

DESCRIPTION OF THE PREFERRED EMBODIMENT

This invention is a novel electron beam generator and a novel electron beam processing system comprising one or more electron beam sources or generators and associated reaction chamber(s). The processing units can be used singly or in combination with other processing units to create an electron beam reaction system that meets the particular needs of a given application. Each processing unit has means for attaching the reaction chamber inlet either directly to the system inlet or into system preprocessing modules from where the flow will feed to the processing portion for treatment. Alternatively, the inlet flow can be to the outlet of an upstream reaction chamber. Each processing unit also has means for attaching a reaction chamber either directly to the system outlet, through system post-processing modules, or to the inlet of a downstream reaction chamber. In addition, an electron beam source may be associated with one or more processing units and means for admitting an electron beam into the reaction chamber(s).

Figure 1:
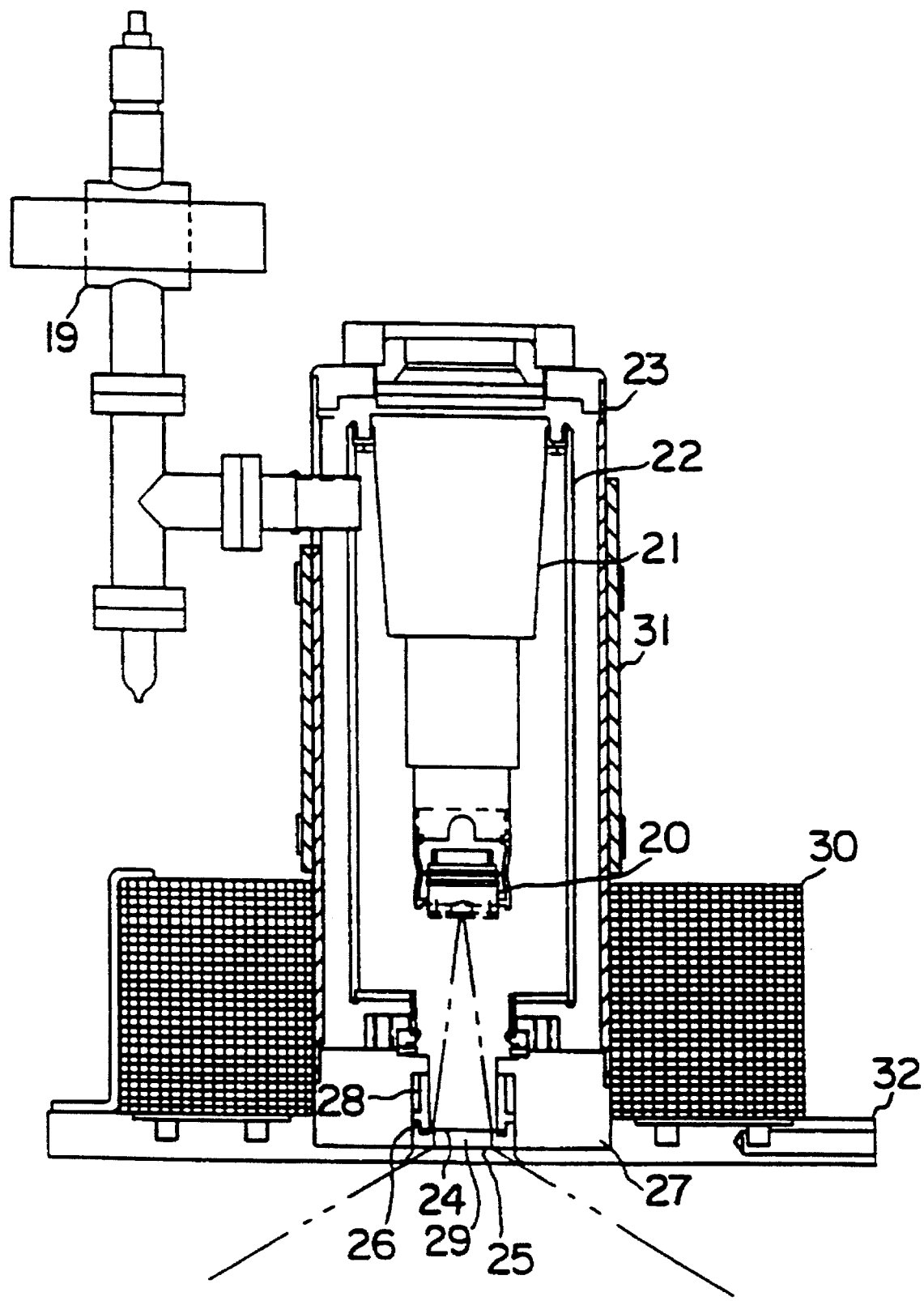
FIG. 1 is a cross-sectional view of the preferred electron beam generator or electron source of this invention.

A preferred embodiment of the electron beam generator is shown in FIG. 1. A high voltage electron gun 20 is attached by way of a ceramic insulator 21 inside vacuum chamber 22 within the electron beam generator housing 23. Optionally, gun 20 contains a control grid or electrode that may be used to modulate or control electron flows. The heated cathode of the gun emits electrons which form a high voltage, high current flux, electrostatically and electromagnetically focused electron beam that is directed through a passage in the vacuum chamber toward a thin vacuum window 24. The material and thickness of the window are carefully selected so as to maintain a hard vacuum, to allow a high percentage of the electron beam to pass through, and to carry away heat generated by that fraction of the beam that is absorbed. Because it needs to be very thin, the material of choice must also be very strong to resist thermal cycling and ambient pressure at elevated temperatures.

Yet another consideration in selecting window material and thickness is control of the angle through which the emerging electron beam diverges. Large beam divergence angles maximize the exposed volume of, and minimize the possibility of voids in the reaction chamber. In our preferred embodiment, a Havar window, less than or approximately 0.002-inch thick is used. Havar is a material sold by Hamilton Precision Metals, Inc. of 1780 Roherstown Road, Lancaster Pa. 17604. It is an alloy having the following composition, amounts are nominal and percents are by weight:

cobalt—42%; chromium—19.5%; iron—19.1%; nickel—12.7%;

tungsten—2.7%; molybdenum—2.2%; manganese—1.6%; and, carbon—0.2%.

Other materials, including beryllium, titanium and stainless steel are alternates for vacuum window 24 and it should be understood that windows of other thicknesses may also be used in the electron sources of this invention. Optionally, vacuum window 24 can be plated or otherwise coated on the side external to the vacuum to provide resistance to corrosion, for example by a thin layer of gold, ceramic or other corrosion resistant material.

The window deflects the beam through half angles in the range from about a few degrees up to approximately twenty degrees. This angle is a function of the window thickness, material, and electron beam energy.

Power losses in the window are a non-linear function of the electron beam energy, which in the preferred embodiment is in the range of from 50,000 to 500,000 electron volts. As beam voltage varies, current density and cooling requirements must be considered in determining appropriate operating conditions.

Figure 3A:
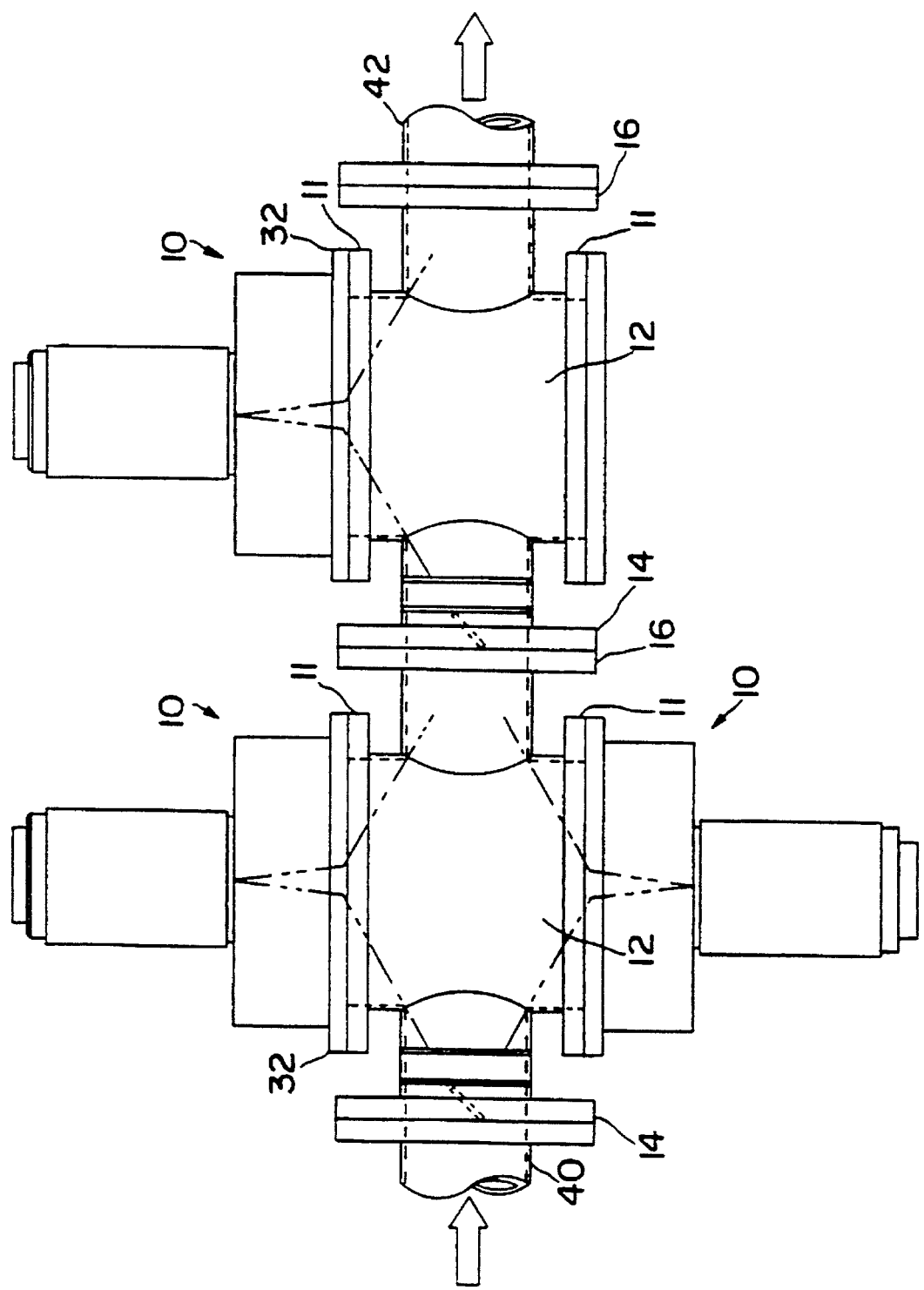
FIG. 3(a) is a schematic drawing of a series arrangement of processing unit modules like those shown in FIG. 2.

After passing through the window, the beam is passed through foil 25 which isolates the vacuum window and acts to scatter the beam as it enters reaction chamber 12 (see FIG. 3a for example). Foil 25 functions to expand the emerging angles of the beam as it enters the reaction chamber. Proper selection of material and its thickness is also crucial. It must be strong, fairly transparent to electrons, and, in combination with vacuum window 24, produce the desired output beam angle.

Another function of scatter foil 25 is to form an impervious chemically resistant barrier isolating vacuum window 24 from the reaction chamber. Materials present in the influent and by-products of certain reactions occurring in the reaction chamber could otherwise rapidly corrode the vacuum window leading to premature system failure.

In our preferred embodiment, a 0.0005 to 0.002 inch thick mica layer is used for scatter foil 25 resulting in a 120-degree included angle electron beam output and excellent resistance to corrosive attack. Other intended scatter foil materials include kapton or sapphire. Alternatively, other materials such as Havar or titanium can be used if plated or otherwise coated on the side facing the contents of the reaction chamber by a thin layer of a corrosion-resistant material such as, for example, gold or ceramic.

A metal spool 26 is brazed into vacuum window housing 27 to form annulus 28 through which cooling water is pumped. It develops a turbulent flowing pattern as it passed through and carries away heat caused by electrons absorbed in vacuum window 24. Supplemental cooling is provided by a controlled flow of non-reactive gas (nitrogen, helium or argon) which is directed through the gap 29 between window 24 and foil 25. In addition to cooling the vacuum window and the scatter foil, this gas flow prevents formation of ozone in the volume of gap 29, as would occur if air were present in that volume, further preventing corrosive attack of critical system components.

In an alternate embodiment, foil 25 may be eliminated. Isolation of the vacuum window 24 from corrosive substances will in this configuration be accomplished by way of a high-flow "curtain" of purge gas which exhausts directly into the reaction chamber, driving those substances away and into the electron beam for treatment. In addition a thin corrosive resistance coating may be applied to the outside of vacuum window 24 to provide further protection.

Vacuum inside chamber 22 is continuously maintained by ion pump 19.

Electromagnetic focus coil 30 supplements electrostatic techniques of focusing the electron beam, which among other things permits its size (diameter) to be altered and controlled remotely. Beam size is important because it establishes power density at the vacuum window and at the scatter foil; the larger the beam diameter, the lower the power density. For example, if gun current were held constant, a small beam would rapidly burn a hole through both window 24 and foil 25. Focus coil 30 allows tailoring of the electron beam output to the size of the reaction chamber 12. For simple systems, this electromagnet can be replaced by a permanent magnet sized for desired beam output characteristics.

A lead (Pb) shield 31 around the outside of the beam generator attenuates xrays generated by electron collisions inside the vacuum chamber 22. This preferred embodiment can be altered to use steel, concrete, or other suitable material for radiation shielding. Additional shielding will be added externally as needed to result in a safe operating environment.

The overall electron beam generator assembly is attached to a mounting flange 32. This flange enables bolted attachment to mating flanges 11 (see FIG. 3a) on reaction chamber 12 or other processing device. This modular approach allows for easy maintenance service and facilitates replacement by another electron beam source having different output characteristics. Incorporated into mounting flange 32 is a water cooling path to keep the reaction chamber heat from reaching the electron beam generator.

Figure 2:
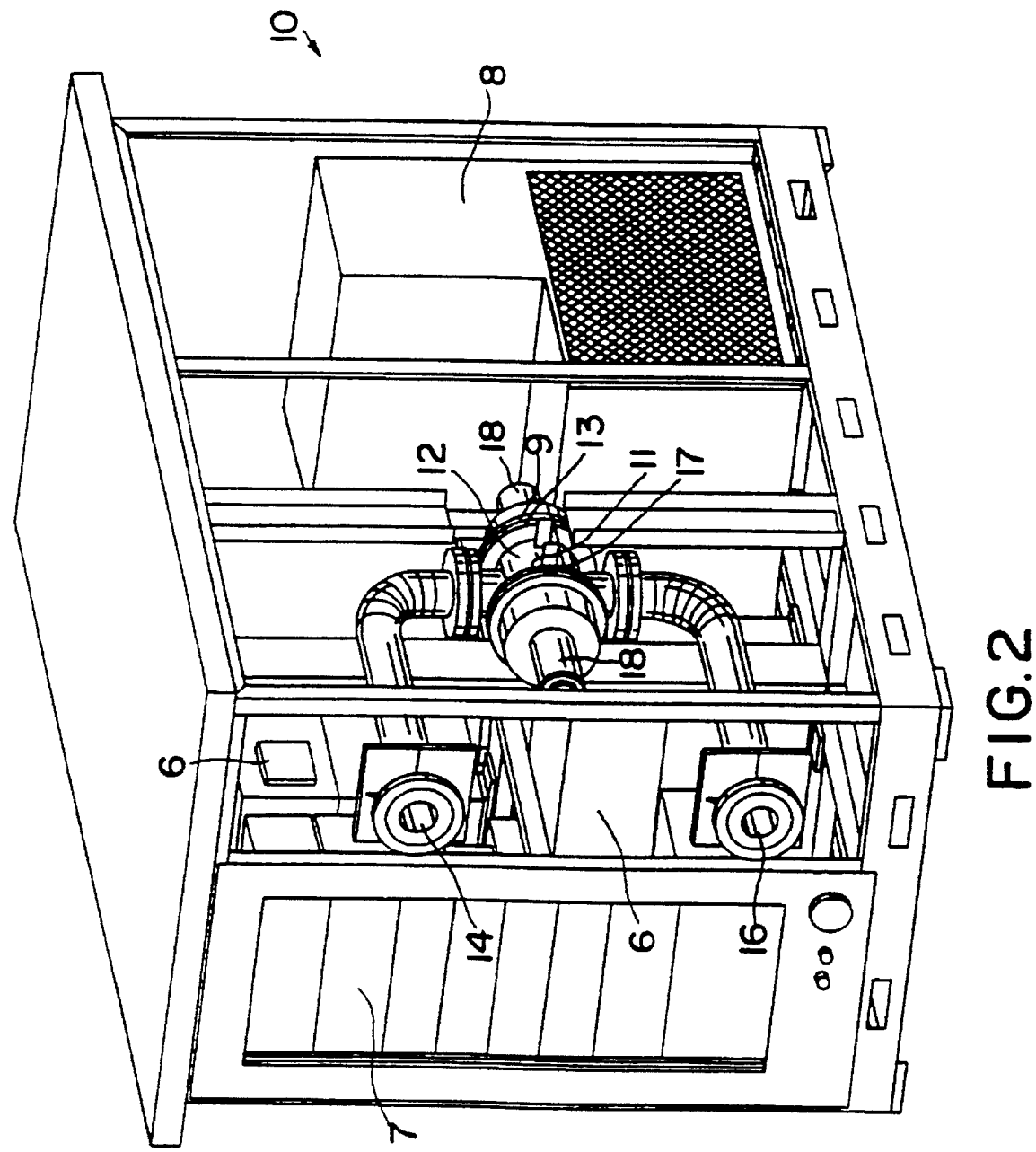
FIG. 2 is a schematic drawing of a processing unit according to a preferred embodiment of this invention.

A preferred embodiment of the overall processing unit is shown schematically in FIG. 2. Processing unit 10 has a reaction chamber 12, preferably formed as a cylinder formed from Hastelloy C-22. Hastelloy C-22 is available from Corrosion Materials, Inc. P.O. Drawer 666 Baker, La. 70714. Hastelloy C-22 is an alloy that has the following composition, amounts being nominal and percentages being by weight:

nickel—56%; chromium—22%; molybdenum—13%; tungsten—3.0%;

iron—3.0%; cobalt—2.5%;; manganese—0.5% max.; vanadium—0.35% max.; silicon—0.08% max.; and carbon—0.010% max.

This material has been selected in recognition of the potentially corrosive atmosphere in the reaction chamber. Other materials (such as polyvinyl chloride, inconel, and austenitic stainless steel) and other chamber body shapes may be used without departing from the scope of this invention depending on the requirements of the intended application. Flanges 14 and 16 extend from the inlet and outlet ends, respectively, of reaction chamber 12. Flanges 14 and 16 serve as means for attaching processing unit 10 to an inflow means feeding influent to the unit for treatment and an outflow means to transfer treated materials to other processing units or to the atmosphere for release, as discussed below.

Electron beam treatment system 10, as shown in FIG. 2, can accommodate influent gas flows of up to about 1,000 cubic feet per minute. With large diameter pipes system 10 can accommodate flows to about 5,000 cubic feet per minute. Other configurations of piping systems within the scope of this invention can accommodate flow rates of up to about 50,000 cubic feet per minute.

In the preferred embodiment, processing unit 10 has two electron beam sources. It should be understood, however, that the processing unit could use one or more than two electron beam sources without departing from the scope of the invention. It should be understood that other means for generating electrons may also be used. What is required is a sufficient electron beam energy to penetrate the vacuum window, typically 30 KeV or greater. The current density of the beam incident on the window will generally be less than 5 milliamperes per square centimeter with typical thermal cooling systems for the window as are usually used with this type source. However, it should be understood that with a more effective cooling system the beam current density may be increased. The incident electron beam on the window should be sized so that it will diverge to no more than a half cone angle of about twenty degrees. This will ensure that electrons that penetrate the window do not contribute appreciably to defocusing and divergence after scatter from the window itself. Each electron beam source 18 can supply average electron beam power to about 5 kilowatts, either continuous or pulsed Electron beams that may be used in this invention include those that are generated by, for example, thermionic devices, plasma generators, certain corona generators, as well as field emission devices. Pulsed linear accelerators may also be used as electron sources within the scope of this invention.

As shown in FIG. 2, two electron beam sources 18 are attached to reaction chamber 12 of the electron beam treatment system 10, preferably by means of flanges 17 and 11 and flanges 9 and 13 on the electron beam sources and on the reaction chamber, respectively. In the event that the system is used with a single electron beam source, the second electron beam source position may be covered by a removable plate attached to flange 13. In this system, influent enters the opening at flange 14 and exits the opening at flange 16. Controls and power supplies 7 drive and control system 10 during operation. The unit includes a heat exchanger 8 for purposes of controlling heat through the system and xray high tension supplies 6 to drive the electron beam sources.

The processing unit shown in FIG. 2 may be constructed to be approximately 4 feet wide by 8 feet long by 5 feet high, and, when containing two electron sources weighs less than about 4,000 pounds. In general processing units in accordance with this invention will be less than about 10 feet long in any surface dimension and will weigh less than about 3 tons.

In order to optimize its effectiveness, an electron beam system must be tailored to the treated material's composition and mass flow rate. One of the design parameters is dose, defined as energy absorbed per unit mass of treated material. The dose required for a particular electron beam application depends on the nature of the material to be treated and the desired chemical transformation of that material. Energy absorbed from the electron beam by the material in the reaction chamber is a function of the power of the electron beam source, the kinetic energy of the electrons in the beam, the spatial distribution of the electrons, the shape and dimensions of the chamber, the mass flow rate of the treated material, the type and concentration of contaminants and the carrier gas. For a given dose, higher mass flow requires higher electron beam power. For example, at a flow rate of 1,000 cubic feet per minute and beam power of 3 kilowatts delivered to reaction chamber 12, each electron source can administer a treatment dose of about 5 watt-seconds per gram to the material flowing through reaction chamber 12.

The upper limit of flow rate through a reaction chamber of given dimensions is defined by the acceptable pressure drop across the reaction chamber due to fluid friction and the maximum electron beam power the system is capable of delivering. Enlarging the reaction chamber requires an increase in electron energy to ensure complete treatment of the material flowing through the reaction chamber. The modular nature of the electron generator described above facilitates the exchange of one electron beam source for another. In addition, fins or other flow directing devices may be added to the interior of the reaction chamber to create turbulence within the reaction chamber, thereby increasing the interaction between the electron beam and the flowing material.

Figure 3B:
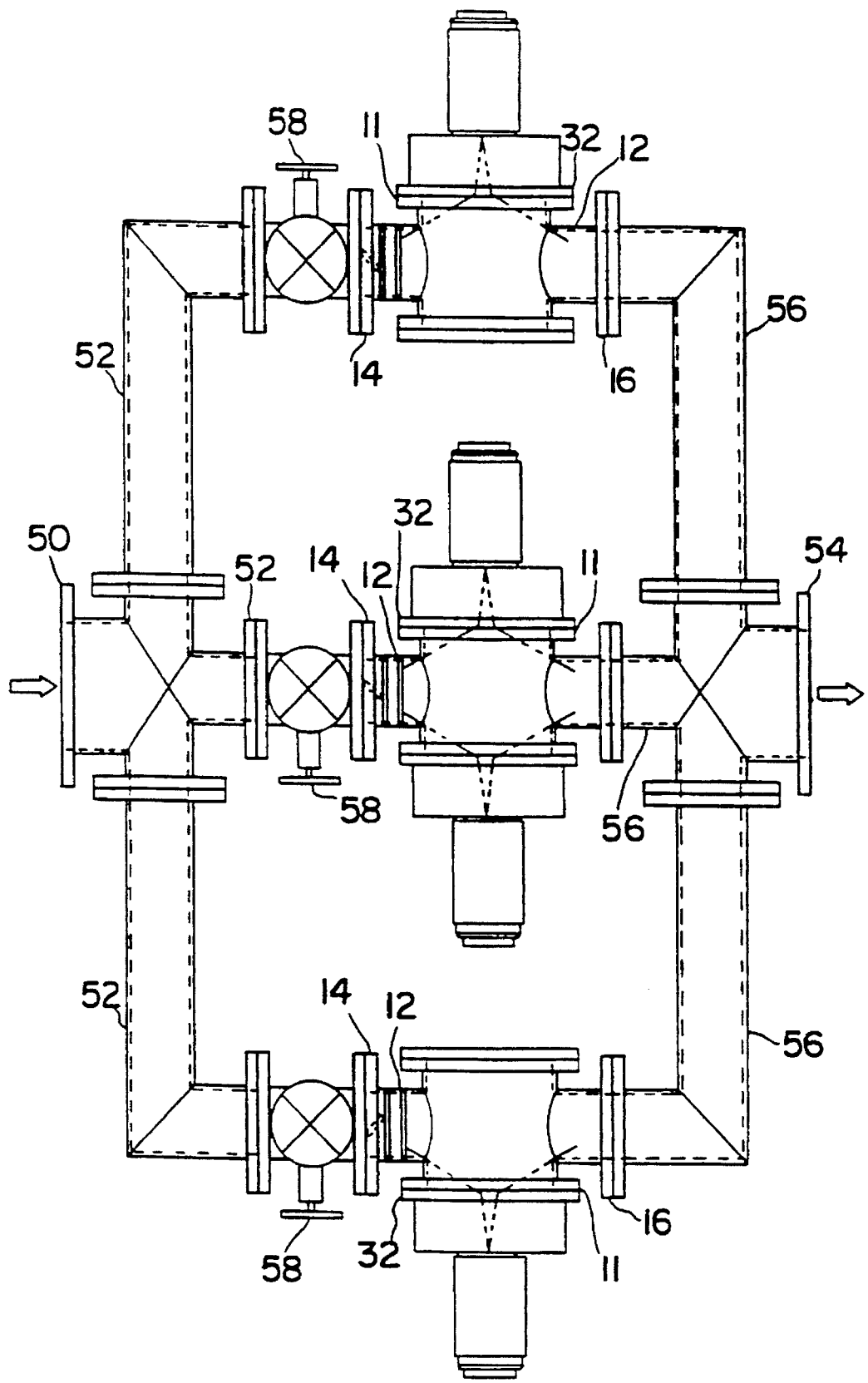
FIG. 3(b) is a schematic drawing of a parallel arrangement of the processing unit modules like those shown in FIG. 2.

The modular nature of the processing unit of this invention facilitates alternate configurations of the electron beam system to meet the material treatment needs of a given application according to the design parameters discussed above. FIGS. 3(a) and 3(b) show two possible configurations. Other configurations apparent to those skilled in the art are within the scope of this invention.

FIG. 3(a) is a schematic drawing of a series arrangement of the processing unit modules shown in FIG. 1. As discussed above, the dose delivered by the processing unit module is a function of electron beam power. Assuming that the physical dimensions of the reaction chamber meet the mass flow requirements of the conversion system input, and assuming that the power of the electron beam source is not changed, the dose delivered by the system can be increased incrementally to at least its required level by attaching the modular processing units serially as shown in FIG. 3(a). Processing units 10 are connected to each other by means of flanges 14 and 16 or by other suitable connecting means. The inlet flange of the first reaction chamber in the series is attached to a flange on an influent duct 40 which delivers influent gas from the material source directly or via any pre-processing system components such as pumps, filters, moisture traps and/or thermal devices. The outlet flange of the last reaction chamber in the series is attached to a flange on an effluent duct 42 which removes treated effluent from the system directly or via any post-processing components such as scrubber and/or carbon adsorption containers. Suitable seals or gaskets are disposed between the flanges to prevent leakage.

FIG. 3(b) is a schematic drawing of a parallel arrangement of the modular processing units of this invention. If the incoming material flow rate exceeds the design flow rate or allowable pressure of the processing unit, the incoming material can be split into two or more separate flows by manifold 50 which delivers influent gas from the material source directly or via any pre-processing components. The inlet flanges 14 or other suitable connecting means of the multiple processing units 10 are attached to flanges on the influent manifold branches 52. Outlet flanges 16 of processing units 10 are attached to flanges on branches 56 of manifold 54 which removes treated effluent from the system directly or via any post-processing components. Valves 58 on influent manifold branches 52 may be used to apportion flow among the branches in any desired ratio.

It is possible, of course, to combine the serial arrangement of FIG. 3(a) with the parallel arrangement of FIG. 3(b) in order to meet the dose and flow rate requirements of the treated material source. The invention also simplifies reconfiguration of the system if the material source changes or the site is different.

The modular reaction chamber of this invention may be used in a dedicated, stationary electron beam conversion system. Because it is relatively small and lightweight and because it can be easily reconfigured, the modular reaction chamber of this invention is particularly useful in a transportable electron beam system.

Additionally, electron beam systems may be used to convert organic contaminants found in soil and groundwater to nontoxic forms.

No two toxic waste sites are the same, however. Each site has different contaminants in varying amounts. In addition, requirements to clean up a site vary over time. The electron beam system of this invention can therefore be configured to meet the initial site requirements, then be transported to the site. When the site requirements change, the system can be reconfigured on site or removed for reconfiguration elsewhere. The entire system can be easily removed from the site when the cleanup is complete.

Figure 4:
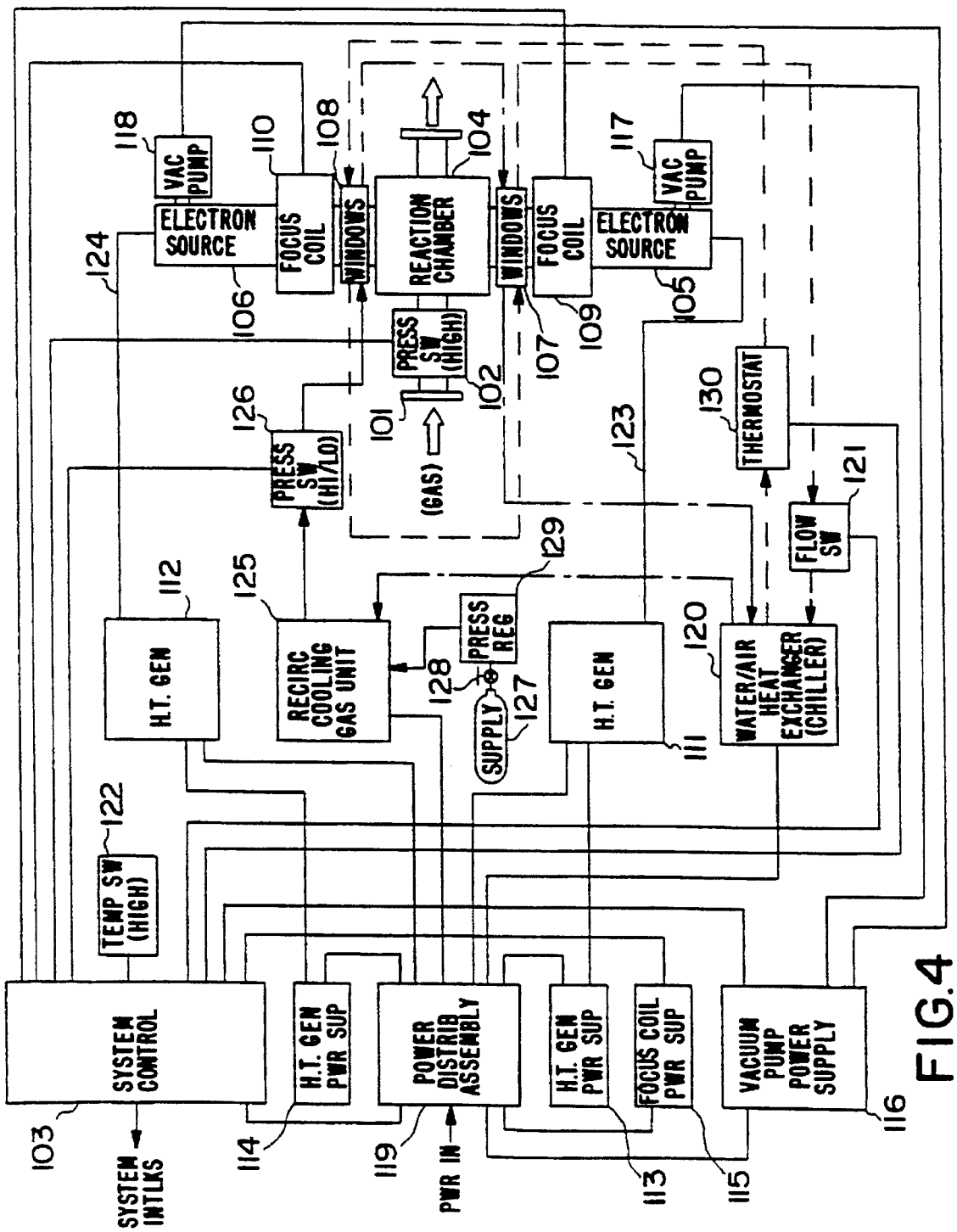
FIG. 4 is a block diagram of a preferred electron beam modular conversion system including system controls.

FIG. 4 is a simplified block diagram showing a preferred embodiment of a modular processing unit in accordance with this invention. This configuration includes two electron sources and one reaction chamber. Alternatively, only one electron source may be included or the system can be configured with more than two sources and more than a single reaction chamber.

One or more modular processing units, such as that of FIG. 4, will typically be employed as the central processor in a system which will also include, external to the processing unit, preprocessing elements and components such as pumps, valves, and filter, and postprocessing stations such as scrubbers and containers of activated charcoal.

Gas to be processed (such as, for example, contaminated air from a soil extraction system, gas from an incinerator or from the output of an industrial process, or from a collection carbon barrel) enters at flange 101. If the pressure of this influent gas exceeds a predetermined limit beyond which the scatter foil might be damaged, high-limit pressure switch 102 signals to system control assembly 103 which in turn signals control means external to the processing unit to reduce or stop the flow or otherwise reduce the incoming pressure. Alternatively, a control valve (not shown) can be included in the processing unit for this purpose.

Optionally, system control assembly 103 can contain means for delivering pulse signals to the optional control electrode or grid in the electron guns of electron sources 105 and 106. For a given average power, pulsing provides the capability of applying higher peak power to the influent flowing through the reaction chamber and such higher peak power can prove useful in those cases where the reaction rate depends on power levels or in those cases where the material under treatment requires an occasional pulse at higher peak power to accomplish an effective transformation.

The influent next flows through the reaction chamber 104 in which it is exposed to electron beams from one or more electron sources such as sources 105 and 106. Sources 105 and 106 direct beams through window assemblies 107 and 108, respectively. Focus coils 109 and 110 enable adjustments, for control of the electron beams, and to assure operation of the processing unit at an efficient level to transfer electron energy from the beams to the gas or other influent passing through reaction chamber 104. Promoters may be added by a mechanism (not shown) positioned to release promoters to the influent flow prior to the reaction chamber to facilitate full conversion of incoming materials.

In the configuration shown, electron sources 105 and 106, respectively, receive direct-current power (DC) via high tension cables 123 and 124 from high tension generators 111 and 112 which are controlled in turn by power control assemblies 113 and 114. Alternatively, more than one electron source can be driven by a single DC source of suitable capacity. The cathodes of electron sources 105 and 106 are heated by conventional electrical means (not shown).

Focus coil power supply 115 provides DC to focus coils 109 and 110 through system control assembly 103 which contains controls for focus adjustments. Alternatively, each focus coil can be fed by a separate power supply, and routing of each power supply to its focus coil can be direct rather than through a separate control assembly.

Electron sources 105 and 106 are equipped respectively with vacuum pumps 117 and 118 to assure that vacuums are maintained during operation and to extend operating life of the sources. Vacuum pump power supply 116 provides DC to the vacuum pumps. Alternatively, a separate power supply assembly can be used for each pump. As an option, these pumps and their power supplies can be omitted at some sacrifice to operating life.

Alternating-current power (AC) is introduced into the processing unit via power distribution assembly 119 which feed the AC to system elements that use AC. Conventional electrical interlocks maybe included for personnel protection.

Refrigerated heat exchanger 120 supplies closed-loop flow of cooling liquid whose temperature is limited by thermostat 130. The liquid flows through cooling elements in window assemblies 108 and 107 and then is returned to heat exchanger 120. Flow switch 121 disables high tension power to electron sources 105 and 106 if water temperature exceeds a pre-set limit. Alternatively, other routing of cooling liquid can be employed. Temperature switch 122 limits operating temperatures within the processing unit enclosure.

Windows 108 and 109 are also cooled, in part, by recirculating gas which, in the preferred embodiment, is argon but alternatively could be another suitable dry, inert gas. This recirculating gas is cooled on passing through heat exchanger 120 flowing through recirculating gas window cooler 125. Cooling-gas pressure is controlled by regulator 129 and monitored by high-low pressure gauge 126 which signals the system control assembly 103 if pressure is outside the programmed limits so that processing unit operations may be discontinued until remedial action is taken. Replenishment of the recirculating gas is provided from supply bottle 127 through valve 128 and regulator 129.

Influent gases from a vacuum extraction system or other source are fed to the system, and undesirable compounds in the gases are either transformed to benign elements or compounds or are removed (or further transformed) by the effluent treatment modules. The system may be made transportable through the use of power generators to provide power and may be mounted on a transportable support such as a truck bed or other movable support which facilitates movement from site to site. In addition, the system's elements are easily reconfigured to meet the specific requirements of each toxic site.

Influent and effluent gases may be monitored on-line by flow sensors and chemical analysis sensors to determine the composition, temperature, and pressure of input and output material. Operation of the electron beam source may also be monitored by measuring the electron beam current either at the power supply or with a toroidal current monitor surrounding the output beam. Analytical instruments and equipment may be located in an equipment monitor with the other system controls. Computers and computer software may be used for system control. Provision may also be made to control the entire system from a remote location.

The electron beam system of this invention may be used to break down volatile organic compounds or other toxic materials in carriers into their elements or to other compounds which are relatively benign and can therefore be released to the atmosphere. A particular advantage of the electron beam system of this invention when used in connection with a carbon containment system is the considerable reduction in the need for the carbon technique of adsorbing toxics which in turn extends the useful life of the normal carbon canisters. This reduction in need also reduces the associated problems with such canisters including permitting for movement and clean up, as previously discussed. The system of this invention also requires far less power or energy to achieve results as compared to existing techniques used in this field.

The electron beam conversion system of this invention requires less fuel to convert toxics to other forms than is required for example by incineration systems. In fact, in the basic operating mode, no material such as oxygen is required in addition to the influent to be processed. Thus, another advantage of this invention over prior art conversion systems is the reduction in the volume of system effluent.

This invention produces very little thermal pollution as compared for example to incineration systems, except in those cases that may require heat to release contaminants for treatment. In fact as should be apparent the preferred embodiments of this invention are inherently energy efficient.

While the examples given above describe an open-loop system in which treated material is either released to the environment or collected in carbon canisters, the electron beam system of this invention may be used in a closed-loop system in which treated material is returned to the material source or to another destination from which it may subsequently be retrieved for reprocessing. Other modifications to the system and to elements thereof will be apparent to those skilled in the art. It is intended to cover this invention broadly within the scope of the claims.

We claim:

1. A processing unit to treat organic compounds with an electron beam comprising a reaction chamber, a source of electrons to direct electrons into said reaction chamber at a power level to cause chemical transformations in said reaction chamber of a flow of organic compounds feeding through said reaction chamber, and controls to pulse said power level of said source of electrons to a higher peak power to enhance transformations in said reaction chamber.

2. A processing unit in accordance with claim 1 in which a cooling gas is flowed across the output surface of said electron source and then flowed into said reaction chamber.

3. A processing unit in accordance with claim 2 in which a cooling liquid is flowed adjacent to the output wall of said electron source through which electrons flow to said reaction chamber.

4. A processing unit to treat organic compounds with an electron beam comprising a reaction chamber, a source of electrons to direct electrons into said reaction chamber at a power level to cause chemical transformations in said reaction chamber of a flow of organic compounds passing through said reaction chamber, and a vacuum pumping system connected to said source of electrons to assure vacuum conditions at said source during the application of electrons to said reaction chamber.

5. A processing unit in accordance with claim 4 in which the average electron beam power to said reaction chamber is up to about 10 kilowatts.

6. A processing unit in accordance with claim 4 in which a cooling liquid is flowed adjacent to the output wall of said electron source through which electrons flow to said reaction chamber.

7. A processing unit in accordance with claim 6 in which said output wall comprises a scatter foil positioned at the output of said electron source.

8. A processing unit to treat organic compounds with an electron beam comprising a reaction chamber, a source of electrons to direct electrons into said reaction chamber at a power level to cause chemical transformations in said reaction chamber of a flow of organic compounds passing through said reaction chamber, a vacuum pumping system connected to said source of electrons to assure vacuum conditions at said source during the application of electrons to said reaction chamber, and means to add a promoter to said reaction chamber to facilitate efficient chemical transformations therein.

* * * * *